(12) United States Patent
Neubacher

(10) Patent No.: US 9,294,905 B2
(45) Date of Patent: Mar. 22, 2016

(54) METHOD FOR ENHANCING THE USE OF PROXIMITY SERVICES IN A PUBLIC LAND MOBILE NETWORK

(71) Applicant: Deutsche Telekom AG, Bonn (DE)

(72) Inventor: Andreas Neubacher, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/399,193

(22) PCT Filed: May 2, 2013

(86) PCT No.: PCT/EP2013/059134
§ 371 (c)(1),
(2) Date: Nov. 6, 2014

(87) PCT Pub. No.: WO2013/167459
PCT Pub. Date: Nov. 14, 2013

(65) Prior Publication Data
US 2015/0141001 A1    May 21, 2015

(30) Foreign Application Priority Data

May 7, 2012    (DE) .......................... 10 2012 008 867

(51) Int. Cl.
*H04W 24/00* (2009.01)
*H04W 8/00* (2009.01)
(Continued)

(52) U.S. Cl.
CPC ................ *H04W 8/005* (2013.01); *H04L 67/16* (2013.01); *H04L 69/24* (2013.01); *H04W 4/023* (2013.01);
(Continued)

(58) Field of Classification Search
CPC ..... H04W 88/06; H04W 64/00; H04W 84/18; H04L 41/12
USPC .................... 455/426.1, 41.2, 456.2; 370/254
See application file for complete search history.

(56) References Cited

U.S. PATENT DOCUMENTS 7,418,268 B1    8/2008  Cabano et al.
2005/0157689 A1   7/2005  Schnurr
(Continued)

FOREIGN PATENT DOCUMENTS

EP       1528714 A1   5/2005
WO    2011130623 A   10/2011

OTHER PUBLICATIONS

Intel: "Operator Managed and Operator Assisted D2D", 3GPP Draft; $3^{rd}$ Generation Partnership Project, vol. SA WG1, Feb. 6, 2012, section 4.2.3.
(Continued)

*Primary Examiner* — Danh Le
(74) *Attorney, Agent, or Firm* — Leydig, Voit & Mayer, Ltd.

(57) ABSTRACT

A method for enhancing the use of proximity services in a public land mobile network includes: in a first step, a base transceiver station receives a first proximity services activation information related to a first user equipment of a plurality of user equipments; in a second step, the base transceiver station receives a second proximity services activation information related to a second user equipment of the plurality of user equipments; in a third step, a proximity services broadcast information is sent from the base transceiver station to the plurality of user equipments within the geographic area; and in a fourth step, the first user equipment starts to emit a first proximity services discovery signal and the second user equipment starts to emit a second proximity services discovery signal.

11 Claims, 1 Drawing Sheet

(51) Int. Cl.
| | |
|---|---|
| *H04W 4/02* | (2009.01) |
| *H04L 29/08* | (2006.01) |
| *H04W 4/06* | (2009.01) |
| *H04L 29/06* | (2006.01) |
| *H04W 52/02* | (2009.01) |
| *H04W 48/10* | (2009.01) |
| *H04W 4/20* | (2009.01) |
| *H04W 84/04* | (2009.01) |
| *H04W 88/06* | (2009.01) |
| *H04W 88/10* | (2009.01) |

(52) U.S. Cl.
CPC ................ *H04W 4/06* (2013.01); *H04W 48/10* (2013.01); *H04W 52/0219* (2013.01); *H04W 52/0251* (2013.01); *H04W 4/206* (2013.01); *H04W 84/042* (2013.01); *H04W 88/06* (2013.01); *H04W 88/10* (2013.01)

(56) References Cited

U.S. PATENT DOCUMENTS

| | | |
|---|---|---|
| 2010/0128701 A1 | 5/2010 | Nagaraja |
| 2011/0105083 A1* | 5/2011 | Wu ................................ 455/411 |
| 2011/0153773 A1 | 6/2011 | Vandwalle et al. |
| 2011/0258313 A1* | 10/2011 | Mallik et al. .................. 709/224 |
| 2011/0288728 A1* | 11/2011 | Ruizenaar ....................... 701/41 |
| 2011/0317586 A1* | 12/2011 | Palanki et al. ................ 370/254 |
| 2012/0044815 A1* | 2/2012 | Geirhofer et al. ............. 370/248 |

OTHER PUBLICATIONS

Fodor, et al., "Design Aspects of Network Assisted Device-to-Device Communications", May, 2011, pp. 2-9.

* cited by examiner

METHOD FOR ENHANCING THE USE OF PROXIMITY SERVICES IN A PUBLIC LAND MOBILE NETWORK

CROSS-REFERENCE TO RELATED APPLICATIONS

This application is a U.S. National Phase application under 35 U.S.C. §371 of International Application No. PCT/EP2013/059134, filed on May 2, 2013, and claims benefit to German Patent Application No. DE 10 2012 008 867.1, filed on May 7, 2012. The International Application was published in English on Nov. 14, 2013 as WO 2013/167459 under PCT Article 21(2).

FIELD

The present invention relates to a method for enhancing the use of proximity services in a public land mobile network.

The present invention further relates to a user equipment for use in a geographic area of an access network of a public land mobile network, and to a base transceiver station for enhancing the use of proximity services.

BACKGROUND

Proximity services, i.e. services discovering users or discovering customers or discovering points of sale or the like, that share the same or similar interests in the vicinity of a mobile device are promising services for customers using such mobile devices. In a wireless communication network, i.e. a public land mobile network, typically a number of base stations or base transceiver stations support communication for a number of user equipments or mobile devices. Such user equipments communicate with the base transceiver station via a downlink and via an uplink connection. The downlink connection refers to the communication link (or to the direction) from the base transceiver station to the user equipment, and the uplink connection refers to the communication link (or to the direction) from the user equipment to the base transceiver station. Furthermore, user equipments or mobile devices are known that are additionally able to communicate directly with other user equipments in geographical vicinity, which is also called device to device communication or peer to peer communication.

Proximity discovery can be achieved by various radio technologies today. These methods rely on continuous or intermediate radio scans and/or transmissions of signals of the user equipment, allowing to detect other users or other customers in geographical proximity of, e.g., 10 to 50 meters, preferably 30 meters, i.e. other user equipments (either being mobile devices or being fixedly installed devices), which are also interested in proximity services. The conventional method (for such user equipments able to communicate with other user equipments via a peer to peer communication link) has the drawback that radio scans and transmissions are required even in case that there is no other user/customer or user equipment at all within the proximity discovery range. This process is strongly draining the batteries of battery-powered user equipments since the transmitters need to be switched on to broadcast information, especially in order to indicate the interest and/or the presence of the user equipment being prepared to engage in proximity services communication. Additionally, such transmissions of radio frequency signals from the user equipments conducting proximity discovery lead to additional interference within the vicinity of such user equipments, which is a considerable drawback and which reduces at least potentially the overall service level of mobile communications both for the user equipment concerned but also for other user equipments. This drawback is all the more important in that such proximity discovery radio frequency signals are even transmitted by user equipments in case that there are no other user equipments or customers or share points at all in the vicinity of the user equipment that emits the proximity discovery radio signals.

SUMMARY

In an embodiment, the invention provides a method for enhancing the use of proximity services in a public land mobile network. The public land mobile network comprises an access network, the access network having a base transceiver station for a geographic area. A plurality of user equipments within the geographic area receive control signals from the base transceiver station. The plurality of user equipment are proximity services-enabled user equipments. In case of an activated proximity services functionality of a user equipment, a proximity services activation information is either stored in the public land mobile network or sent by that user equipment, and the user equipment emits a proximity services discovery signal. The method includes the following steps: in a first step, the base transceiver station receives a first proximity services activation information related to a first user equipment of the plurality of user equipments; in a second step, the base transceiver station receives a second proximity services activation information related to a second user equipment of the plurality of user equipments; in a third step, a proximity services broadcast information is sent from the base transceiver station to the plurality of user equipments within the geographic area; and in a fourth step, the first user equipment starts to emit a first proximity services discovery signal and the second user equipment starts to emit a second proximity services discovery signal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
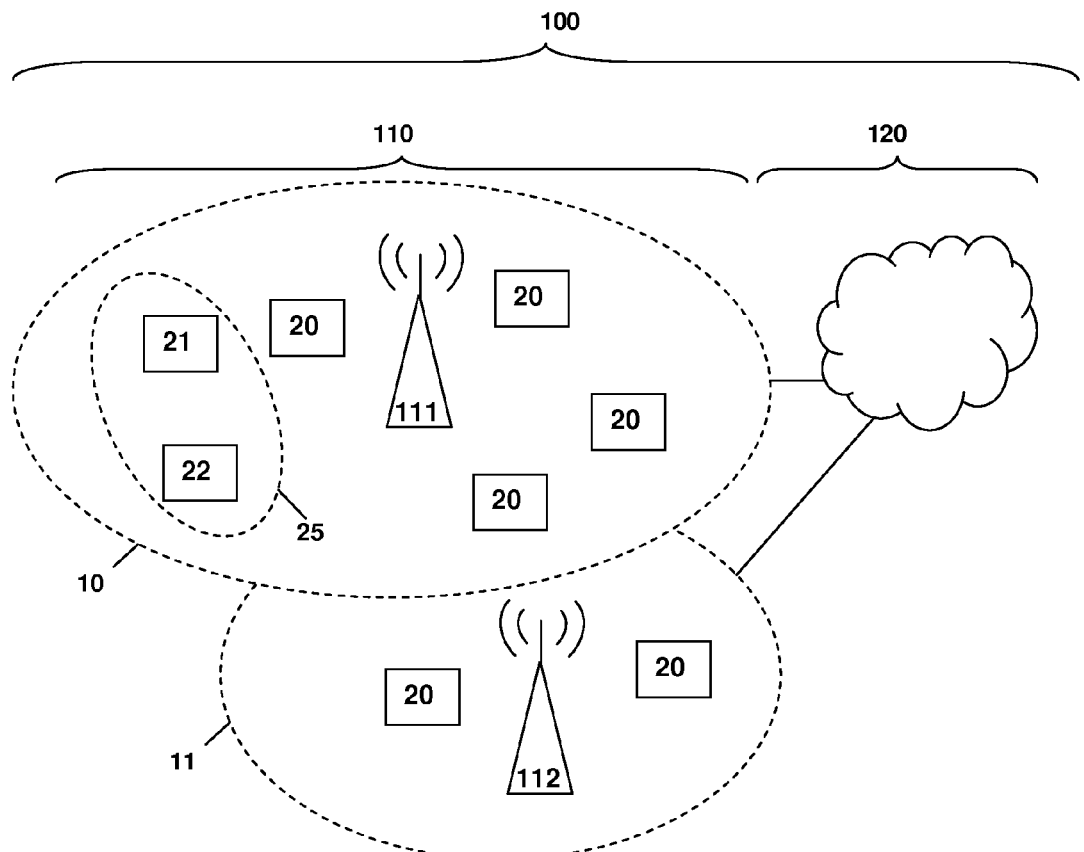
FIG. 1 schematically illustrates a geographic area of a public land mobile network comprising a core network and an access network as well as a plurality of user equipments.

In an embodiment, the invention provides for enhancing the use of proximity service in a public land mobile network that allows to reduce the use of proximity discovery events and transmissions of user equipments related to proximity discovery, especially in order to reduce energy consumption by user equipments, especially in case of battery-powered mobile devices, and also to reduce interference problems or interference effects caused by such proximity discovery events of user equipments in case that there are no other user equipments or proximity services enabled devices in the vicinity.

In an embodiment, the invention provides a method for enhancing the use of proximity services in a public land mobile network, wherein the public land mobile network comprises an access network, the access network having a base transceiver station for a geographic area, wherein a plurality of user equipments within the geographic area receive control signals from the base transceiver station, wherein the plurality of user equipment are proximity services enabled user equipments, wherein in case of an activated proximity services functionality of a user equipment a proximity services activation information is either stored in the public land mobile network or sent by that user equipment, wherein in case of an activated proximity services functionality of a user equipment that user equipment emits a proximity services discovery signal, wherein the method comprises the following steps:

in a first step, the base transceiver station receives a first proximity services activation information related to a first user equipment of the plurality of user equipments,
in a second step, the base transceiver station receives a second proximity services activation information related to a second user equipment of the plurality of user equipments,
in a third step, a proximity services broadcast information is sent from the base transceiver station to the plurality of user equipments within the geographic area,
in a fourth step, the first user equipment starts to emit a first proximity services discovery signal and the second user equipment starts to emit a second proximity services discovery signal.

According to the present invention, a user equipment trying to use proximity services (or trying to establish a direct communication link to another user equipment in the vicinity) is assisted with the decision when to start a radio scan to scan for other user equipments interested in proximity services and/or having the same interests relating to proximity services in the vicinity, and with the decision when to start a radio transmission to announce the own presence and/or to announce (additional) interests regarding proximity services towards other user equipments in the vicinity. According to the present invention, the wide-range coverage of a public land mobile network, especially a cellular mobile communications network is advantageously combined with the proximity services related functionalities of user equipments to use the transceivers of the user equipment to discover other user equipments also being interested in the use of proximity services functionalities in the proximity. Typically, proximity services are provided by devices or user equipments like cellular phones that are comparably widespread. According to the present invention, the user equipment interested in using proximity services functionality receives information about other user equipments or other customers being likewise interested in such proximity services functionality from the public land mobile network, especially from the base transceiver station, on which at least one of these user equipments is camping or to which at least one of these equipments is connected to. According to the present invention, in a geographic area such as a radio cell of a public land mobile network, a plurality of user equipments is proximity-services-enabled, which means that the plurality of user equipments is operable in a first mode of operation having a proximity services functionality activated and in a second mode of operation having a proximity services functionality deactivated. According to the present invention, in case that a first user equipment (being connected to the base transceiver station of the public land mobile network) has an activated proximity services functionality at a given point in time, a first proximity services activation information that is related to the first user equipment is provided to the base transceiver station in a first step of the inventive method. In a second step, the base transceiver station receives a second proximity services activation information related to a second user equipment. The first and second steps can either be more or less simultaneous or spaced in time (preferably with an upper limit corresponding to a predetermined time out time interval), depending on when the first and second user equipment activates the proximity services functionality (or enters the geographic area with the proximity services functionality being activated). In a third step, i.e. after having received at least the first and second proximity services activation information (and the second proximity services activation information not too long after the first proximity services activation information such that the time out time interval is exceeded), a proximity services broadcast information is sent from the base transceiver station to the plurality of user equipments within the geographic area such as to inform the plurality of user equipments about the fact that at least the first user equipment and the second user equipment have activated proximity services functionality. In the fourth step according to the present invention, the first user equipment starts to emit a first proximity services discovery signal and the second user equipment starts to emit a second proximity services discovery signal in order to start or try to establish a device to device or peer to peer communication link between the first user equipment and the second user equipment. This means that, according to the present invention, a priority to establish a peer to peer communication link between the first and second user equipment is not to directly (instantaneously after activating the proximity services functionality) discover the other user equipment respectively and directly establish the peer to peer communication link,
but to first announce to the base transceiver station of the public land mobile network the information that such user equipments have currently an activated proximity services functionality, such that the base transceiver station in turn provides a common or pool proximity services discovery signal by means of broadcasting the proximity services broadcast information to the plurality of user equipments within the geographic area. Thereby, it is possible according to the present invention, to reduce negative interference effects that would otherwise be created by a multitude of user equipments transmitting radio frequency signals to establish a proximity services connection with other user equipments. After having received the proximity services broadcast information (indicating to the first user equipment that in the vicinity of the first user equipment, there exists another proximity-services-enabled user equipment having activated proximity services functionality (namely the second user equipment) and indicating to the second user equipment that in the vicinity of the second user equipment, there exists another proximity-services-enabled user equipment having activated proximity services functionality (namely the first user equipment)), the first and second user equipments start to discover proximity services opportunities, especially by matching respective profile information. According to the present invention, no matching functionality is provided by the base transceiver station at all.

Alternatively, according to the present invention, in the third step, the proximity services broadcast information is sent from the base transceiver station to the plurality of user equipments within the geographic area depending on the first proximity services activation information and/or the second proximity services activation information.

Alternatively, according to the present invention, in the third step, the proximity services broadcast information is broadcast from the base transceiver station to the plurality of user equipments within the geographic area, if the base transceiver station receives the first proximity services activation information and/or the second proximity services activation information. Preferably, the proximity services broadcast information is broadcast from the base transceiver station to all user equipments within the geographic area. Preferably, the proximity services broadcast information is broadcast from the base transceiver station to all user equipments, which have activated proximity services functionality.

Alternatively, according to the present invention, the method is executed only on the base transceiver station.

Alternatively, according to the present invention, in the fourth step, the first user equipment starts to emit a first proximity services discovery radio frequency signal and/or the second user equipment starts to emit a second proximity services discovery radio frequency signal. Preferably the first and/or second proximity services discovery radio frequency signals are emitted for establishing a direct wireless communication link between the first and/or second user equipment and/or another user equipment of the plurality of user equipments in the geographic area. Preferably, in a fifth step, the wireless communication link is established between the first and second user equipment. Preferably, in the fifth step, a device-to-device wireless communication link and/or peer-to-peer wireless communication link is established between the first and second user equipment.

According to the present invention, there exist two mechanisms to provide to the base transceiver station the first and second proximity services activation information or generally a proximity services activation information related to an arbitrary proximity-services-enabled user equipment within the radio cell of the base transceiver station: According to a first mechanism, such a proximity-services-enabled user equipment has indicated to the public land mobile network (especially stored in a profile information within a network entity of the core network of the public land mobile network, such as the HLR (home location register) or the HSS (home subscriber server)) that the user equipment is potentially capable to be operated for proximity services functionality, and that in case of this user equipment currently trying to establish a proximity services connection with a further user equipment (or having activated the proximity services functionality), only a corresponding indication to the public land mobile network (typically via the base transceiver station) is provided such that upon receipt of such an indication to the public land mobile network, the base transceiver station receives the respective proximity services activation information related to that user equipment (i.e. a first proximity services activation information in case of a first user equipment and a second proximity services activation information in case of the second user equipment).

According to a second mechanism according to the present invention, the respective proximity services activation information is directly sent from the respective user equipment to the base transceiver station (typically while not being stored in (a network node of the core network of) the public land mobile network).

In both cases or according to both mechanisms, the first and second proximity services activation information is transmitted or provided to the base transceiver station.

According to a preferred embodiment of the present invention, the emission of the first and second proximity services discovery signal is prevented during the first, second and third step.

Thereby, it is advantageously possible to easily reduce battery draining of user equipments that try to establish a proximity services radio link to other user equipments in the vicinity.

According to a further preferred embodiment of the present invention, the first proximity services activation information comprises an indication relating to at least one out of the following:
  special interests of the user of the first user equipment,
  the capabilities of the first user equipment,
  the status, related to proximity services, of the first user equipment,
  the current location of the first user equipment,
  the time of last activation of the proximity services functionality of the first user equipment,
  data of previous proximity services events of the first user equipment, wherein the second proximity services activation information comprises an indication relating to at least one out of the following:
  special interests of the user of the second user equipment,
  the capabilities of the second user equipment,
  the status, related to proximity services, of the second user equipment,
  the current location of the second user equipment,
  the time of last activation of the proximity services functionality of the second user equipment,
  data of previous proximity services events of the second user equipment.

Thereby, it is advantageously possible according to the present invention that either the general interest of the first and/or second user equipment relating to proximity services functionality can be transmitted or indicated to the base transceiver station but it is also, additionally, possible that besides the general intention to use proximity services functionality of the first and/or second user equipment, an indication about special interests and/or capabilities of the first and/or second user equipments, about the status related to proximity services of the first and/or second user equipment, about the current location of the first and/or second user equipment, about the time of last activation of the proximity services functionality of the first and/or second user equipment and about data of previous proximity services events of the first and/or second user equipment can be transmitted.

According to still another preferred embodiment of the present invention, the proximity services broadcast information comprises an indication relating to at least one out of the following:
  special interests of the user of the first and/or second user equipments,
  the capabilities of the first and/or second user equipments,
  the status, related to proximity services, of the first and/or second user equipments,
  the current location of the first and/or second user equipments,
  the time of last activation of the proximity services functionality of the first and/or second user equipments,
  data of previous proximity services events of the first and/or second user equipments,
  the number of user equipments being related to a specific special interest of their user, the current average location of user equipments being related to a specific special interest of their user, the number of user equipments being involved in activated proximity services functionality.

Thereby, it is advantageously possible according to the present invention to provide general information about at least the first and second user equipment being currently interested in proximity services functionality to all the potentially interested user equipments within the radio cell of the base transceiver station, and thereby avoiding a plurality of radio frequency transmission initiated by the respective user equipments in order to discover proximity services opportunities and also avoiding the respective battery draining associated with such transmissions.

Furthermore, the present invention relates to a user equipment for use in a geographic area of an access network of a public land mobile network, wherein the access network comprises at least one base transceiver station, wherein the user equipment receives control signals from the base transceiver station, wherein the plurality of user equipment are proximity services enabled user equipments, wherein the user equipment is configured such that in case of an activated proximity services functionality of the user equipment a proximity services activation information is made available to the base transceiver station, wherein the user equipment is configured such that in case of an activated proximity services functionality of the user equipment the user equipment emits a proximity services discovery signal dependent on the reception of a proximity services broadcast information from the base transceiver station.

According to the present invention, the user equipment in case of an activated proximity services functionality of the user equipment does transmit the proximity services discovery signal only dependent on the reception of a proximity services broadcast information from the base transceiver station. In order to avoid unnecessary battery draining and unnecessary interference problems.

It is furthermore preferred according to the present invention also with respect to the user equipment that the emission of the proximity services discovery signal is prevented prior to the reception of the proximity services broadcast information.

According to further preferred embodiments of the present invention also with respect to the user equipment it is preferred that the proximity services activation information is sent by the user equipment to the public land mobile network or to the base transceiver station.

Additionally, the present invention relates to a base transceiver station for enhancing the use of proximity services in a geographic area of an access network of a public land mobile network, wherein the access network comprises the base transceiver station, wherein a plurality of user equipments in the geographic area receive control signals from the base transceiver station, wherein the plurality of user equipment are proximity services enabled user equipments, wherein the base transceiver station is configured such that in case of an activated proximity services functionality of a user equipment the base transceiver station receives a proximity services activation information from a network element of the public land mobile network or from the user equipment, wherein the base transceiver station is configured to broadcast a proximity services broadcast information to the plurality of user equipments in case that the base transceiver station receives:

a first proximity services activation information related to a first user equipment of the plurality of user equipments, and a second proximity services activation information related to a second user equipment of the plurality of user equipments.

According to the present invention, the base transceiver station receives in case of an activated proximity services functionality of a user equipment a proximity services activation information either directly from that user equipment or from a network element of the public land mobile network (typically located within the core network of the public land mobile network providing a profile information regarding proximity services functionality related to the user equipment) and broadcasts a proximity services broadcast information to the plurality of user equipments in case that the base transceiver station receives a respective proximity services activation information for at least a first user equipment and a second user equipment.

It is furthermore preferred according to the present invention also with respect to the base transceiver station that the first proximity services activation information comprises an indication relating to at least one out of the following:

special interests of the user of the first user equipment, the capabilities of the first user equipment, the status, related to proximity services, of the first user equipment, the current location of the first user equipment, the time of last activation of the proximity services functionality of the first user equipment, data of previous proximity services events of the first user equipment, wherein the second proximity services activation information comprises an indication relating to at least one out of the following:

special interests of the user of the second user equipment, the capabilities of the second user equipment, the status, related to proximity services, of the second user equipment, the current location of the second user equipment, the time of last activation of the proximity services functionality of the second user equipment, data of previous proximity services events of the second user equipment.

According to further preferred embodiments of the present invention also with respect to the base transceiver station it is preferred that the proximity services broadcast information comprises an indication relating to at least one out of the following:

special interests of the user of the first and/or second user equipments, the capabilities of the first and/or second user equipments, the status, related to proximity services, of the first and/or second user equipments, the current location of the first and/or second user equipments, the time of last activation of the proximity services functionality of the first and/or second user equipments, data of previous proximity services events of the first and/or second user equipments, the number of user equipments being related to a specific special interest of their user, the current average location of user equipments being related to a specific special interest of their user, the number of user equipments being involved in activated proximity services functionality.

Additionally, the present invention relates to a program comprising a computer readable program code which, when executed on a computer or on a user equipment or on a base transceiver station, causes the computer or the user equipment or the base transceiver station to perform the inventive method.

Still additionally, the present invention relates to computer program product for using a user equipment with a base transceiver station, the computer program product comprising a computer program stored on a storage medium, the computer program comprising program code which, when executed on a computer or on the user equipment or on the base transceiver station, causes the computer or the user equipment or the base transceiver station to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a geographic area 10 (and a further geographic area 11) of a public land mobile network 100 is schematically shown, the public land mobile network 100 comprising an access network 110 and a core network 120. In the geographic area 10, a plurality of user equipments 20 are located, camping on a radio cell served by a base transceiver station 111 for the geographic area 10. The further geographic area 11 is served by a further base transceiver station 112 and comprises likewise a plurality of user equipments 20. Within the user equipments 20, at least a part are such user equipments that are proximity-services-enabled user equipments, i.e. such user equipments are operable in a first mode of operation having a proximity services functionality activated and in a second mode of operation having a proximity services functionality deactivated. In the example shown in FIG. 1 a first user equipment 21 and second user equipment 22 are proximity-services-enabled. According to the present invention, this means that a (first) proximity services activation information is either stored in the public land mobile network 100 (and provided to the base transceiver station 111) or sent by the respective user equipment 20 to the base transceiver station 111. This means that the base transceiver station receives a first proximity services activation information related to the first user equipment 21 either directly from the first user equipment 21 or from an entity of the core network 120 of the public land mobile network 100 and likewise a second proximity services activation information related to the second user equipment 22. Upon reception of at least a first and second proximity services activation information by the base transceiver station 111, the base transceiver station 111 broadcasts a proximity services broadcast information to the plurality of user equipments 20 within the geographic area 10 which allows the user equipments 20, especially the first and second user equipments 21, 22 to know that there exist other user equipments currently interested in the use of proximity services functionality. According to the present invention, only after reception of such proximity services broadcast information from the base transceiver station 111, the first and second user equipment 21, 22 start to transmit a respective proximity services discovery signal (i.e. a first proximity services discovery signal by the first use equipment and second proximity services discovery signal by the second user equipment).

The core network 120 is only schematically shown by means of a cloud representation. The public land mobile network 100 (especially the core network 120) comprises typically various network elements such as a HLR (home location register) and a HSS (home subscriber server) that store proximity services activation information in case that such information is stored in the public land mobile network and not directly transmitted from the respective user equipment to the base transceiver station.

Figure 2:
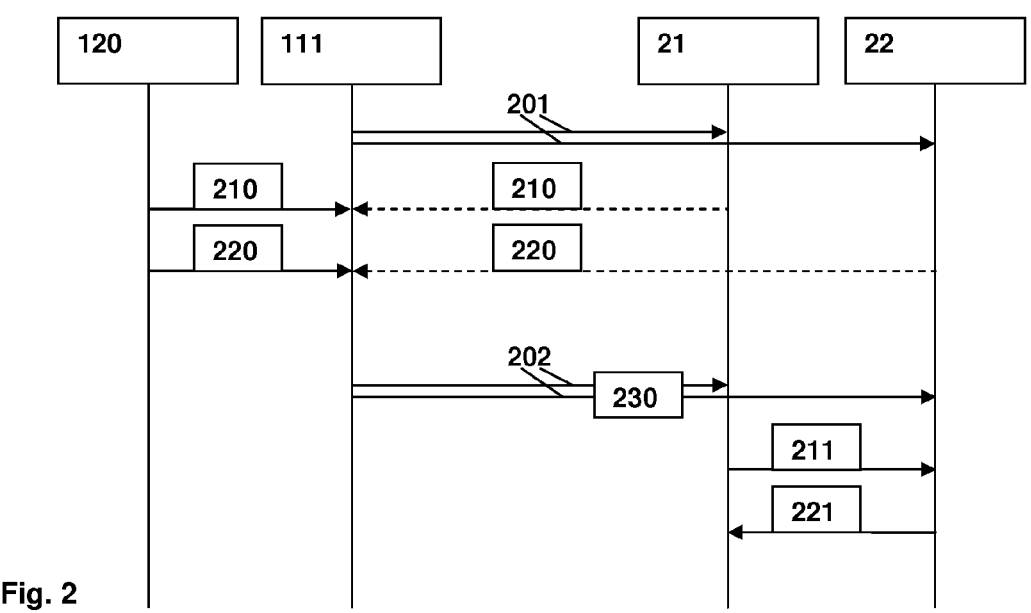
FIG. 2 schematically illustrates a communication diagram between a base transceiver station and a user equipment according to the present invention.

In FIG. 2, a communication diagram between the base transceiver station 111, the core network 120 and a first and second user equipment 21, 22 is schematically shown. By means of first control signals 201, sent from the base transceiver station 111 to all user equipments 20 within the radio cell of the base transceiver station 111, i.e. also to the first user equipment 21 and to the second user equipment 22, the first and second user equipment 21, 22 are served to camp on the radio cell (or geographic area 10) of the base transceiver station 111. According to a first step according to the present invention, the base transceiver station 111 receives a first proximity services activation information related to the first user equipment 21 and a second step a second proximity services activation information related to the second user equipment 22. Such proximity services activation information might either be sent directly from the user equipments (indicated by means of dashed lines in FIG. 2) or from the core network 120 upon an indication of the respective user equipment 21, 22 that currently proximity service functionality should be activated and corresponding profile information to be sent from the core network 120 to the base transceiver station 111. In a third step according to the present invention, by means of a second control signal 202, especially sent on a broadcast channel of the base transceiver station, a proximity services broadcast information 230 is sent from the base transceiver station 111 to the plurality of user equipments 20 within the geographic area 10, i.e. also to the first user equipment 21 and to the second user equipment 22. It is only upon receipt of this proximity services broadcast information 230 that the first and second user equipments 21, 22 start to transmit proximity services discovery signals, i.e. a first proximity services discovery signal 211 by the first user equipment 21 and a second proximity services discovery signal 221 by the second user equipment 22. Thereby it is advantageously possible according to the present invention to prevent the transmission of such first and second proximity services discovery signals 211, 221 during the first, second and third step (and repeatedly in case of non successful attempts). The first and second user equipments 21, 22 then start to match their corresponding proximity services functionality, i.e. match their proximity profile, and furthermore, the first and second user equipments 21, 22 may start to activate their transceivers in order to transmit via radio frequency signals their presence. According to the present invention, no matching functionality is provided by the base transceiver station 111.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhancing the use of proximity services in a public land mobile network, wherein the public land mobile network comprises an access network, the access network having a base transceiver station for a geographic area, wherein a plurality of user equipments within the geographic area receive control signals from the base transceiver station, wherein the plurality of user equipment are proximity services-enabled user equipments, wherein—in case of an activated proximity services functionality of a user equipment—a proximity services activation information is either stored in the public land mobile network or sent by that user equipment and the user equipment emits a proximity services discovery signal, wherein the method comprises the following steps:
   in a first step, the base transceiver station receives a first proximity services activation information related to a first user equipment of the plurality of user equipments;
   in a second step, the base transceiver station receives a second proximity services activation information related to a second user equipment of the plurality of user equipments;
   in a third step, a proximity services broadcast information is broadcasted from the base transceiver station to the plurality of user equipments within the geographic area, wherein the proximity services broadcast information indicates that one or more user equipments have activated proximity services functionality; and
   in a fourth step, in response to receiving the proximity services broadcast information, the first user equipment starts to emit a first proximity services discovery signal and the second user equipment starts to emit a second proximity services discovery signal.

2. The method according to claim 1, wherein the emission of the first and second proximity services discovery signal is prevented during the first, second and third steps.

3. The method according to claim 1, wherein the first proximity services activation information comprises an indication relating to at least one of the group consisting of:
   special interests of the user of the first user equipment,
   the capabilities of the first user equipment,
   the status, related to proximity services, of the first user equipment,
   the current location of the first user equipment,
   the time of last activation of the proximity services functionality of the first user equipment, and
   data of previous proximity services events of the first user equipment;
   wherein the second proximity services activation information comprises an indication relating to at least one of the group consisting of:
   special interests of the user of the second user equipment,
   the capabilities of the second user equipment,
   the status, related to proximity services, of the second user equipment,
   the current location of the second user equipment,
   the time of last activation of the proximity services functionality of the second user equipment, and
   data of previous proximity services events of the second user equipment.

4. The method according to claim 1, wherein the proximity services broadcast information comprises an indication relating to at least one of the group consisting of:
   special interests of the user of the first and/or second user equipments,
   the capabilities of the first and/or second user equipments,
   the status, related to proximity services, of the first and/or second user equipments,
   the current location of the first and/or second user equipments,
   the time of last activation of the proximity services functionality of the first and/or second user equipments,
   data of previous proximity services events of the first and/or second user equipments,
   the number of user equipments being related to a specific special interest of their user,
   the current average location of user equipments being related to a specific special interest of their user, and
   the number of user equipments being involved in activated proximity services functionality.

5. A user equipment for use in a geographic area of an access network of a public land mobile network, wherein the access network comprises at least one base transceiver station,
   wherein the user equipment is configured to receive control signals from the base transceiver station,
   wherein the user equipment is a proximity services-enabled user equipment, and
   wherein the user equipment is configured such that—in case of an activated proximity services functionality of the user equipment—a proximity services activation information is made available to the base transceiver station by the user equipment and the user equipment emits a proximity services discovery signal in response to reception of a proximity services broadcast information broadcast from the base transceiver station, wherein the proximity services broadcast information indicates that one or more user equipments have activated proximity services functionality.

6. The user equipment according to claim 5, wherein the user equipment is configured such that emission of the proximity services discovery signal is prevented prior to the reception of the proximity services broadcast information.

7. The user equipment according to claim 5, wherein the user equipment is configured such that the proximity services activation information is sent by the user equipment to the public land mobile network or to the base transceiver station.

8. A base transceiver station for enhancing the use of proximity services in a geographic area of an access network of a public land mobile network, wherein the access network comprises the base transceiver station, wherein a plurality of user equipments in the geographic area receive control signals from the base transceiver station, wherein the plurality of user equipment are proximity services-enabled user equipments, wherein the base transceiver station is configured such that—in case of an activated proximity services functionality of a user equipment—the base transceiver station receives a proximity services activation information from a network element of the public land mobile network or from the user equipment, wherein the base transceiver station is configured to broadcast a proximity services broadcast information to the plurality of user equipments in case that the base transceiver station receives: a first proximity services activation information related to a first user equipment of the plurality of user equipments, and a second proximity services activation information related to a second user equipment of the plurality of user equipments;

wherein the proximity services broadcast information indicates that one or more user equipments have activated proximity services functionality.

9. The base transceiver station according to claim 8, wherein the first proximity services activation information comprises an indication relating to at least one of the group consisting of:

special interests of the user of the first user equipment,
the capabilities of the first user equipment,
the status, related to proximity services, of the first user equipment,
the current location of the first user equipment,
the time of last activation of the proximity services functionality of the first user equipment, and
data of previous proximity services events of the first user equipment;

wherein the second proximity services activation information comprises an indication relating to at least one of the group consisting of:

special interests of the user of the second user equipment,
the capabilities of the second user equipment,
the status, related to proximity services, of the second user equipment,
the current location of the second user equipment,
the time of last activation of the proximity services functionality of the second user equipment, and
data of previous proximity services events of the second user equipment.

10. The base transceiver station according to claim 8, wherein the proximity services broadcast information comprises an indication relating to at least one of the group consisting of:

special interests of the user of the first and/or second user equipments,
the capabilities of the first and/or second user equipments,
the status, related to proximity services, of the first and/or second user equipments,
the current location of the first and/or second user equipments,
the time of last activation of the proximity services functionality of the first and/or second user equipments,
data of previous proximity services events of the first and/or second user equipments,
the number of user equipments being related to a specific special interest of their user,
the current average location of user equipments being related to a specific special interest of their user, and
the number of user equipments being involved in activated proximity services functionality.

11. A non-transitory, processor-readable medium having processor-executable instructions stored thereon for enhancing the use of proximity services in a public land mobile network, wherein the public land mobile network comprises an access network, the access network having a base transceiver station for a geographic area, wherein a plurality of user equipments within the geographic area receive control signals from the base transceiver station, wherein the plurality of user equipment are proximity services-enabled user equipments, wherein—in case of an activated proximity services functionality of a user equipment—a proximity services activation information is either stored in the public land mobile network or sent by that user equipment and the user equipment emits a proximity services discovery signal, the processor-executable instructions, when executed by a processor, facilitating performance of the following steps:

in a first step, the base transceiver station receives a first proximity services activation information related to a first user equipment of the plurality of user equipments;
in a second step, the base transceiver station receives a second proximity services activation information related to a second user equipment of the plurality of user equipments;
in a third step, a proximity services broadcast information is broadcasted from the base transceiver station to the plurality of user equipments within the geographic area, wherein the proximity services broadcast information indicates that one or more user equipments have activated proximity services functionality; and
in a fourth step, in response to receiving the proximity services broadcast information, the first user equipment starts to emit a first proximity services discovery signal and the second user equipment starts to emit a second proximity services discovery signal.

* * * * *